Jan. 21, 1930.  V. E. LASWELL  1,744,317
ROTARY SWING
Filed Sept. 22, 1928    2 Sheets-Sheet 1
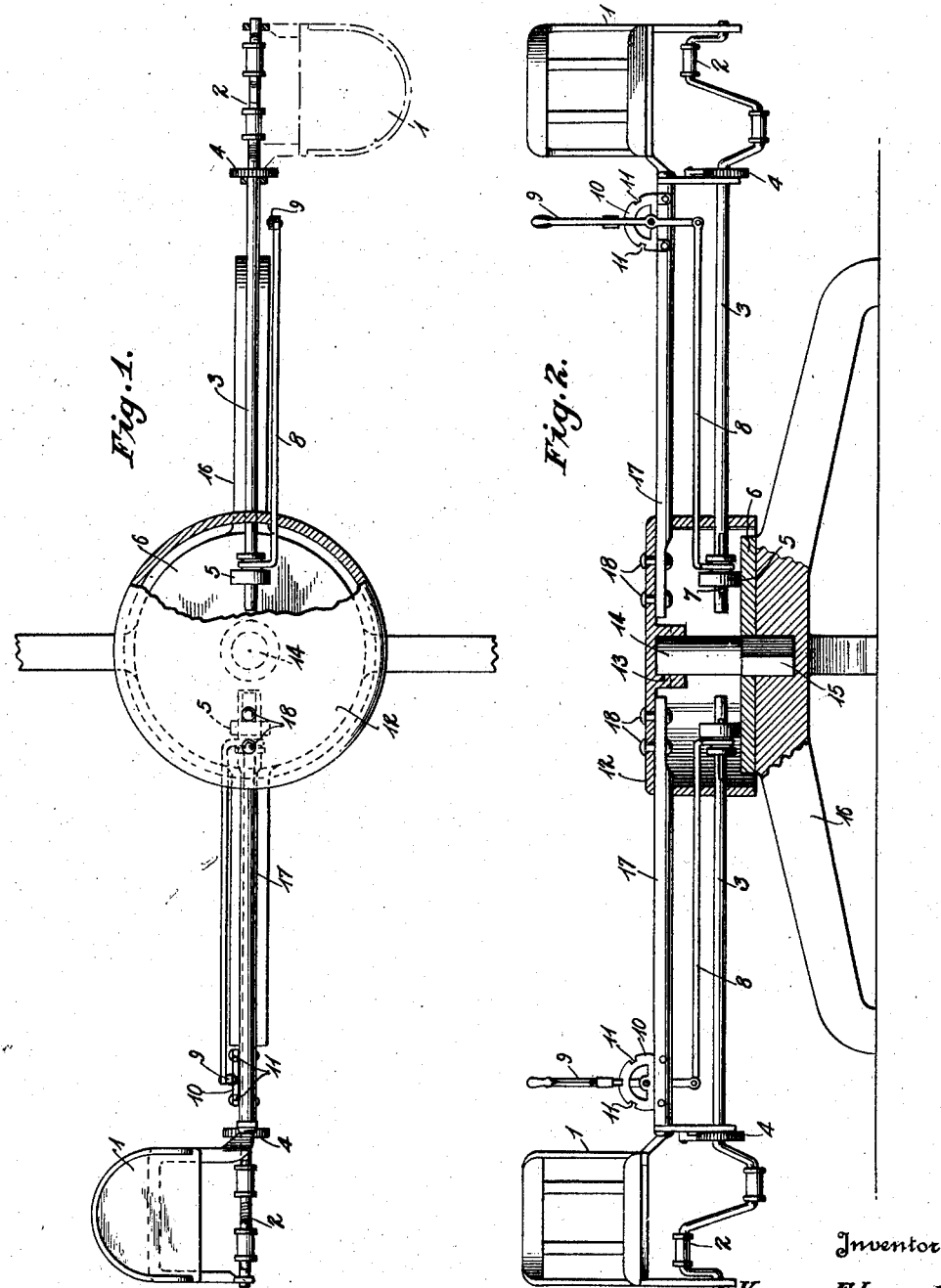
Inventor
Vernon E. Laswell Jan. 21, 1930.  V. E. LASWELL  1,744,317
ROTARY SWING
Filed Sept. 22, 1928  2 Sheets-Sheet 2

Inventor
Vernon E. Laswell
By Bacon & Thomas
Attorneys

Patented Jan. 21, 1930

1,744,317

UNITED STATES PATENT OFFICE

VERNON E. LASWELL, OF TALLADEGA, ALABAMA, ASSIGNOR, BY DIRECT AND MESNE ASSIGNMENTS, OF ONE-HALF TO WILLIAM M. ROZELLE, ONE-FOURTH TO H. H. THORNTON, AND ONE-FOURTH TO RUTH S. WARD, ALL OF TALLADEGA, ALABAMA

ROTARY SWING

Application filed September 22, 1928. Serial No. 307,718.

This invention relates to rotary swings or as termed herein for the purposes of convenience "merry-go-rounds".

It is an object of the invention to provide a merry-go-round with a plurality of seats for the operators and a pedal driven shaft simulating that of a bicycle by which the revolution of the swing is accomplished by the manual effort of the occupants of said seats.

Such devices in a broad aspect are old and known to those skilled in the art as exemplified for instance by Oltersdorf No. 1,663,278, March 20, 1928.

It is one of the objects of my invention to provide such rotary swings or merry-go-rounds with means for changing the gear ratio by a lever extension situated in proximity of the seat of the occupant so that the speed at which the swing is revolved may be varied at will in accordance with the revolutions imparted to the driving shaft by the reciprocations of the cranks or pedals.

The invention also comprehends the provision of a novel form of friction gearing by which this ratio may be selectively controllable by the operator.

Another object of the invention is to provide a tapered worm drive having a compensating cam associated therewith by which this speed at which the swing revolves may be varied in accordance with optimum conditions with a minimum of ease.

Referring now specifically to the drawings wherein like reference characters represent corresponding parts, Figure 1 represents a top view of the device;

Figure 2 is an elevation partly in section of this form of apparatus;

Figure 4 is a sectional view thereof; while

Figure 5:
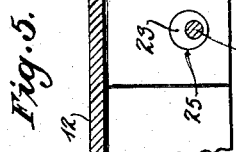
Figure 5 is a detailed view showing the association of the cam.

Referring now specifically to the drawings, 1 represents seats for the occupants of which there may be any desired number. Located below these seats are cranks 2 simulating pedals of a bicycle for rotating the drive shaft 3. Interposed between the crank and the shaft 3 is a one-way clutch 4, the purpose of which is to permit the shaft to be turned in one direction only and in the event that the occupant of one of the seats does not desire to propel the cranks the same may be held stationary; or in other words, he may "coast". The drive shafts are provided with friction gears 5 engaging the stationary horizontally disposed friction gear 6. This drive gear 5 is splined to the shaft 3 as at 7 and is provided with control rods 8 operable by levers 9 situated in proximity to the driver's seat 1. These levers 9 are provided with spring pressed plungers engageable in recesses 10 of the segment 11 so that the gearing ratio of the gears 5 and 6 may be predetermined. Manifestly the pedaling of the cranks 2 will cause the device to be revolved together with the cup-shaped turnstile 12. This turnstile is provided with a recess 13 in which a supporting pin 14 is located, which supporting pin is squared as at 15 and is non-rotatably mounted in the support 16. Framework 17 extends through the cup-shaped turnstile and is riveted thereto as at 18. It will thus be clear that the manual effort of the occupant in pedaling the crank will cause the turnstile and the framework 17 to revolve relatively to the friction disk 6 and the support 16.

The device herein described has particular use in playgrounds and like institutions. If a child of tender years is to occupy the merry-go-round seats the gearing ration may be changed so that a relatively high number of revolutions on the shaft 3 occasioned by the reciprocations of the child's feet will revolve the device with a minimum of effort but at a comparatively low speed. If, however, the device is to be employed by children of more mature age the factor of amusement is greatly enhanced by the change speed device in view of the fact that such child may selectively change the gearing ratio from high to low and thus at one time revolve the swing very fastly and in another instant revolve the same comparatively slowly. The device, therefore, overcomes the monotony of a merry-go-round which revolves at substantially constant speed. Furthermore, in the event that a great load is placed upon the merry-go-round the gearing ratio may be changed so that the same may be revolved without too much labor on the part of the occupants.

Figure 3:
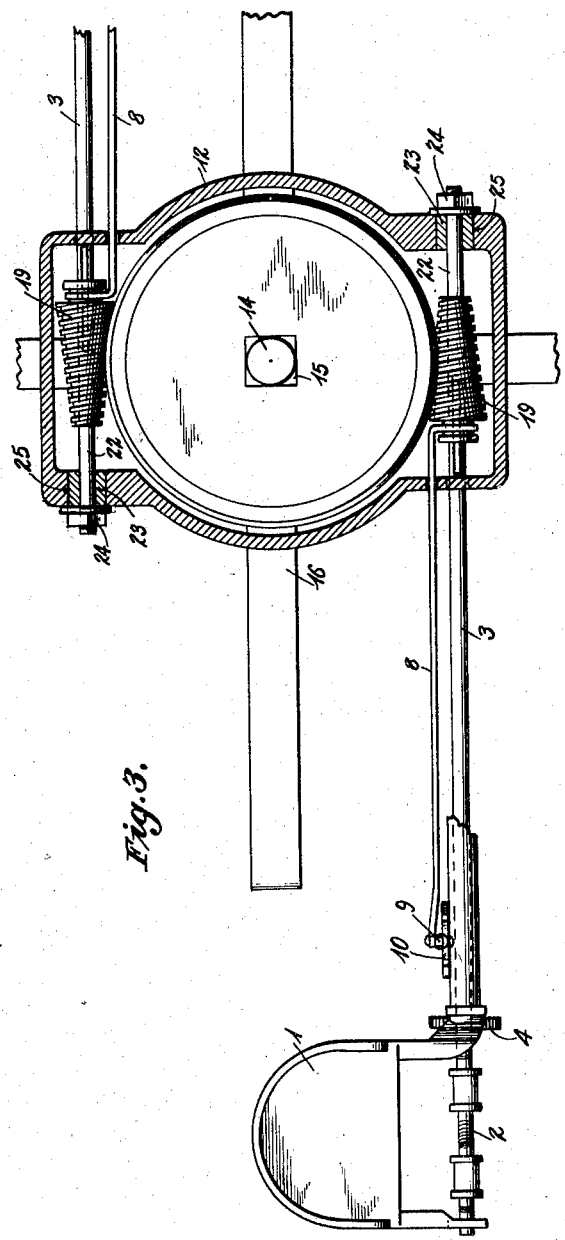
Figure 3 is a plan view partly in section of a somewhat different form of driving mechanism.
Figure 4:
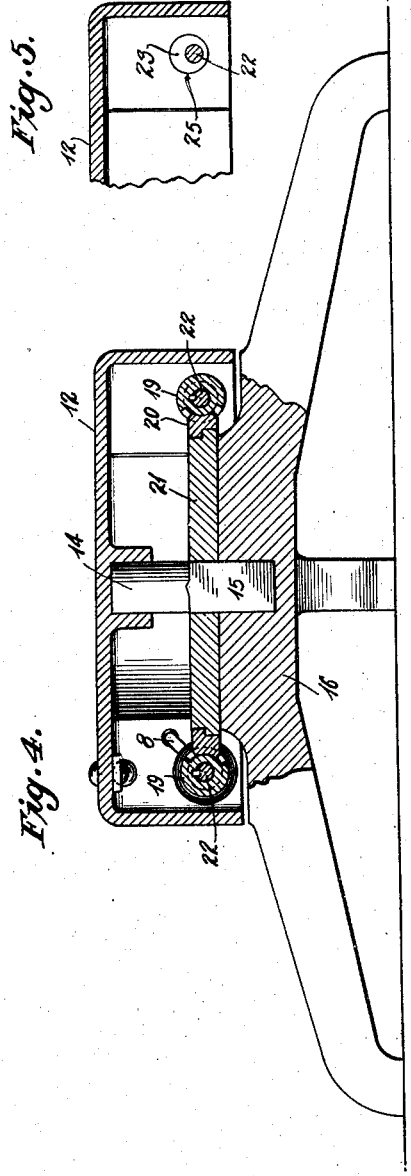

In Figure 3 I have shown another form of drive which is identical with that hereinabove described excepting that the means for changing the gearing ratio is somewhat different. Instead of employing the friction gear I provide in this form of apparatus tapered worms 19 which are engaged by teeth 20 provided on the periphery of the stationary element 21. In this instance the shaft 3 is provided with an extension 22 on which is secured an eccentric 23 held in place by a lock nut 24. In the operation of this variant form of my invention the worm gear 19 of tapered formation is reciprocated by the control levers 9 in the same manner as the other form of my apparatus and this reciprocation causes the rotation of a cam 23 within the opening 25 provided by the housing. The eccentric therefore compensates for the increased diameter of the worm as it is reciprocated back and forth to selectively obtain different gearing ratios. In all other substantial respects this form of the apparatus closely approximates that shown in Figures 1 and 2.

It is also contemplated by me to provide a motor attachment for either form of my invention which may be connected to the drive shafts 3 or either of them and employed independently of the manual means for revolving the device if desired.

It will be appreciated by those skilled in the art that I have shown preferred constructions and have described the same in detail but I do not wish to be limited to the exact construction shown as I realize that various other changes may be made without departing from the spirit of my invention as defined in the following claims:

Having thus described the invention, what I claim is:

1. In a rotary swing, the combination with a support and framework rotatably mounted thereon, a plurality of seats for occupants associated with the framework, drive shafts operatively connected with the support and cranks associated with said drive shaft and adapted to be manually revolved by the occupants, and means for selectively controlling the gearing ratio between the drive shaft and support to vary the speed of the revolution of the swing in accordance with the revolutions of the drive shaft.

2. A rotary swing of the character described, comprising a support having a stationary gear associated therewith, a framework with seats for occupants located thereon, drive shafts having gears non-rotatably connected therewith and movable relatively to the stationary gear and means in proximity to the operator for selectively varying the gearing ratio as between said movable and immovable gears.

3. A rotary swing of the character described, comprising a support and a framework on which is secured seats for occupants, a drive shaft for revolving said swing, said drive shaft having associated therewith pedals for manual operation by the occupants to revolve the shaft and thereby turn the swing and means for selectively varying the revolution of a swing for a predetermined revolution of the driving shaft, said means comprising a slidable change speed gearing operable from the seat of the operator to effect varying speeds of revolution of the swing.

4. A rotary swing of the character described, comprising a support for rotatably receiving the rotary swing thereon, said swing including a plurality of seats for the occupants, drive shafts for effecting the revolution of the swing, said drive shafts having crank extensions for manual operation by the occupant, a one-way clutch interposed between the cranks and the shafts whereby the shaft may be revolved only in one direction, a slidable gear connected with the inner extremities of the shafts and engaging a stationary gear associated with said support, said slidable gears being operable to selectively vary the speed of revolution of the swing in accordance with a given revolution of the drive shafts.

5. A rotary swing of the character described comprising a support having a friction gear non-rotatably secured thereto and in a horizontal disposition, a housing having secured thereto the framework of the swing, seats for occupants associated with the framework, drive shafts extending through the housing and provided with slidable friction gears at the terminal portions thereof, said shafts having crank extensions for pedaling operation by the occupants and a change speed lever for shifting the movable friction gears relative to the horizontal stationary frictional gear to change the speed of the apparatus.

6. A rotary swing of the character described, comprising a support provided with a friction plate horizontally disposed thereon, a supporting pin non-rotatably mounted in the support and friction gear, a revolvable housing substantially enclosing said gear and carrying the framework of the swing upon which is mounted the seats for the occupants, driving shafts having movable friction gears mounted thereon and confined within said housing, said driving shafts being operated by pedaling devices by the occupants within said seats, and means for shifting the said movable friction gears relatively to the stationary gear to vary the speed of the swing.

7. A rotary swing of the character described, comprising a supporting base having associated therewith a non-rotatable friction gear, said swing comprising framework rotatably mounted with respect to the support and having mounted thereon seats for occupants of the swings, means for manually revolving said swing, said means comprising drive shafts having crank extensions adapted to be pedaled by the occupants of the seat and having associated with the inner terminal portions thereof cooperable friction gears for revolving the swing upon rotation of the shaft and means for changing the speed ratio of said gears, said means being controllable by the occupants of the swing.

8. A rotary swing of the character described comprising a supporting base and a stationary gear mounted thereon, a turnstile associated with said base and having connected therewith framework for the swing, said framework having mounted thereon seats for occupants, means for revolving said swing, said means comprising drive shafts having cranks adapted for manual operation associated therewith and in proximity to the seat of the occupant, a worm gear of tapered formation cooperable with such stationary gear for moving the swing upon revolution of the drive shaft, means for selectively varying the gearing ratio of the worm gear and the stationary gear, and a compensating device associated with the shaft for moving the tapered worm to or from the stationary gear upon reciprocatory movement thereof.

9. A rotary swing of the character described comprising a support having a peripheral gear stationarily disposed thereon, framework for the swing, seats for occupants mounted on the framework, means for revolving the swing, said means comprising a drive shaft having cranks adapted for pedaling operation by the occupants of the seats, gears connected with the inner extremities of the drive shafts for engaging said peripheral gear, said gears taking the form of tapered worms, means for varying the speed ratio by shifting the tapered worms and means for compensating for the shifting operation to move the tapered worms toward or away from the stationary ring gear.

In testimony whereof I affix my signature.

VERNON E. LASWELL.